(12) United States Patent
Goddard et al.

(10) Patent No.: US 7,306,264 B2
(45) Date of Patent: Dec. 11, 2007

(54) PIPE HAVING A WATER-TIGHT IN-LINE BELL

(75) Inventors: James B. Goddard, Powell, OH (US); William V. Shaffer, Powell, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 10/037,219

(22) Filed: Nov. 9, 2001

(65) Prior Publication Data

US 2003/0090106 A1    May 15, 2003

(51) Int. Cl.
*F16L 11/11* (2006.01)
*F16L 17/02* (2006.01)

(52) U.S. Cl. .................. 285/903; 285/374; 138/173

(58) Field of Classification Search ............ 285/903, 285/252, 253, 374; 138/121, 155, 173; 454/903
See application file for complete search history.

(56) References Cited

U.S. PATENT DOCUMENTS

| | | | |
|---|---|---|---|
| 3,188,121 A * | 6/1965 | Cude et al. | ............ 285/197 |
| 3,239,254 A | 3/1966 | Campbell | |
| 3,926,222 A | 12/1975 | Shroy et al. | |
| 4,049,480 A * | 9/1977 | Kutschke | ............ 156/94 |
| 4,141,576 A | 2/1979 | Lupke et al. | |
| 4,149,740 A | 4/1979 | Hall | |
| 4,443,031 A | 4/1984 | Borsh et al. | |
| 4,647,074 A | 3/1987 | Pate et al. | |
| 4,795,197 A | 1/1989 | Kaminski et al. | |
| 4,913,473 A * | 4/1990 | Bonnema et al. | ............ 285/423 |
| 4,971,477 A * | 11/1990 | Webb et al. | ............ 405/154.1 |
| 5,071,173 A | 12/1991 | Hegler et al. | |
| 5,072,972 A * | 12/1991 | Justice | ............ 285/373 |
| 5,132,073 A * | 7/1992 | Nielsen | ............ 264/506 |
| 5,163,717 A * | 11/1992 | Wise | ............ 285/236 |
| 5,348,051 A * | 9/1994 | Kallenbach | ............ 138/109 |
| 5,632,307 A * | 5/1997 | Fawley et al. | ............ 138/99 |
| 5,765,880 A | 6/1998 | Goddard | |
| 5,836,918 A * | 11/1998 | Dondlinger | ............ 604/171 |
| 5,996,635 A | 12/1999 | Hegler | |
| 6,126,209 A | 10/2000 | Goddard | |
| 6,199,592 B1 | 3/2001 | Siferd et al. | |

(Continued)

FOREIGN PATENT DOCUMENTS

DE          3831611 A1    3/1990

(Continued)

OTHER PUBLICATIONS

International Search Report, date Feb. 26, 2003

*Primary Examiner*—Kenneth Thompson
(74) *Attorney, Agent, or Firm*—Finnegan, Henderson, Farabow, Garrett & Dunner, L.L.P.

(57) ABSTRACT

In a corrugated pipe comprising two sections joined by telescopically mating a male end of one section with a female end of the other section, an annular sealing element is fixed to the exterior surface of the male end and disposed to sealingly engage the interior surface of the female end. An annular band of reinforcing material is disposed around the exterior surface of the female end at a position along the longitudinal axis thereof that is in general alignment with the sealing element. The reinforcing material resists loss of sealing engagement between the female end and the sealing element during use of the pipe.

25 Claims, 3 Drawing Sheets

U.S. PATENT DOCUMENTS

| | | | |
|---|---|---|---|
| 6,371,154 B1 * | 4/2002 | Kesterman et al. | 137/315.01 |
| 6,460,897 B1 * | 10/2002 | Manuli | 285/256 |
| 6,578,882 B2 | 6/2003 | Toliver | |
| 6,948,718 B2 * | 9/2005 | Shaffer et al. | 277/626 |

FOREIGN PATENT DOCUMENTS

| | | | |
|---|---|---|---|
| EP | 0 482 277 A1 | | 4/1992 |
| EP | 595742 | * | 5/1994 |
| MX | 9907382 A | | 4/2001 |
| WO | WO 00/31457 | | 6/2000 |

* cited by examiner

PIPE HAVING A WATER-TIGHT IN-LINE BELL

FIELD OF THE INVENTION

The present invention relates generally to pipe, and more particularly, to a pipe which is formed having a water-tight in-line bell.

BACKGROUND OF THE INVENTION

This invention is directed to the providing of corrugated pipe, and more particularly to the providing of corrugated pipe of the type used in the drainage of soil for agricultural, residential, recreational, or civil engineering construction purposes, including but not limited to storm sewer uses. In this particular market, clay or concrete tile, tube, or pipe was traditionally utilized. In practice, the drainage pipe was installed through the placing together of relatively short sections of the pipe to construct the desired drainage system. Such sections or pieces could range from a few feet to more than a couple of dozen feet. Consequently, construction was extremely time consuming and relatively expensive because of the number of pieces and total weight associated with the components of the drainage system. Additionally, the relatively large number of pipes which were required to be installed for such systems necessitated proper positioning of an extremely large numbers of pipe in order to insure minimal leakage.

More recently, plastic began to be used as a construction material for drainage pipe. Originally, sections of the plastic pipe or tubing were provided in predetermined lengths or sections which then were interconnected by using separate couplers or coupling units. Sometimes pipe or tubing of a relatively small diameter rolls of more than 200 feet can be used, which can impact on cost savings and ease of assembly. For pipe with greater diameters, ease of assembly and cost savings often focused on the manufacture of the coupler and the ease of installation.

This focusing on coupler structure resulted in numerous couplers for use with corrugated pipe, all of which had an exterior diameter greater than the exterior diameter of the sections of installed pipe. Consequently, it became necessary to dig a trench wide enough to accommodate the diameter of the installed coupler and to also dig a hole in the pipe bedding to accomodate this coupler and maintain proper line and grade. Additional ground needed to be disturbed and additional fill needed to be replaced, both of which factors would drive up the cost of installation.

As mentioned briefly above, couplers are well known in the prior art. A typical type of coupler could involve a polyethylene wrap secured about the adjacent ends of pipe by a fastener. These split-couplers normally require an overlap, such that the gap between the interior surface of the coupler and the exterior surface of the pipe is invariably present. Even if a gasket is placed between the adjacent pieces of pipe, installation in conjunction with the wrapped coupler may still result in a leak. A coupler similar to this is disclosed in U.S. Pat. No. 3,239,254 to Campbell.

Another type of coupler involves a heat shrink wrap as is disclosed in Lupke, et al, U.S. Pat. No. 4,141,576. Obviously, this type of coupler has disadvantages and applications with large diameter corrugated pipe where there is a need for the pipe to remain water-tight over an extended period of time.

A number of couplers are known which comprise two arcuate sections, hinged or independent of one another, with these two sections being secured together. Examples of such couplers include Borsch, et al, U.S. Pat. No. 4,443,031, and Pate, U.S. Pat. No. 4,647,074. However, both of these couplers are specifically designed to work with annular conduit systems, as opposed to helical. This distinction is important, because it is far easier to effect a water-tight seal on an annular system than it is with helical due to the configuration of the respective conduit structures. Meanwhile, many types of extruded pipe are formed using the helical technique.

Several patents disclose couplers for use with helical pipe. Examples of such patents include Hall, U.S. Pat. No. 4,149,740 and Kaminski, U.S. Pat. No. 4,795,197. Hall discloses a pipe coupler for use with pipe which appears substantially helical. However, interestingly enough the ends of each pipe section with which the coupler of Hall can be used either must be flat and level as shown in FIG. 3 of Hall, or fabricated with the outwardly extending flanges as shown in its FIG. 2. Consequently, Hall recognized the problem associated with trying to obtain a water tight seal in true helical pipe.

The Kaminski patent discloses a coupling for seed and fertilizer hoses, and as such is not concerned with whether the coupling is effectively water-tight. Its concern is providing a relatively air-tight seal. Although the coupling of Kaminski could be used with true helical pipe, it would not be expected to perform in drainage applications so as to guarantee the integrity of the drainage system.

Ideally it would be desirable to lay corrugated drainage pipe that would incorporate an in-line bell. A plastic pipe having an in-line bell is shown in Hegler, U.S. Pat. No. 5,071,173, however, this pipe is specifically designed for sewer pipe reconstruction, a practice known in the trade as relining. The pipe of Hegler was not designed to serve as the initial drainage pipe laid at a particular location.

Shroy, et al, U.S. Pat. No. 3,926,222, discloses a corrugated tubing with integral coupling means thereon. However, this particular invention relates only to single wall pipe, as opposed to dual wall. Additionally, no provision is made for attempting to obtain a tight seal, such as through the use of a sealing element.

An in-line bell pipe designed to serve as initial drainage pipe is shown in Goddard, U.S. Pat. No. 6,126,209. However, when subjected to internal pressure, the pipe as disclosed would not remain water-tight, a characteristic desirable in some drainage applications.

It is thus apparent that the need exists for an improved pipe which provides for a water-tight in-line bell, and especially one which is a dual-wall pipe.

SUMMARY OF THE INVENTION

In accordance with this invention an indeterminate length of pipe comprised of at least two corrugated sections of pipe joined by a coupler component is provided. The coupler component has a male portion and a female portion to connect two of the corrugated sections. Each corrugated section has a plurality of first corrugations. Each of the first corrugations has a crest and a valley with the distance between the crest and valley of each of the first corrugations being a first distance.

The male portion of each corrugated section has at least one second corrugation. Each second corrugation has a crest and valley with the distance between the crest and valley of each second corrugation being a second distance. The male portion of each corrugated section has at least one third corrugation. Each third corrugation has a crest and valley with the distance between the crest and valley of each third corrugation being a third distance. The crest of each third corrugation has a recessed area, with the recessed area accommodating a sealing element, for example, a gasket. The sealing element is retained between the recessed area and the female portion.

The second distance and the third distance each are less than the first distance. The female portion telescopically receives the third corrugation and at least a portion of the second corrugation. The female portion has a reinforcing means on a segment of the exterior surface of the female portion.

The pipe preferably is dual-wall. In one embodiment of the invention the pipe includes a fourth corrugation. The fourth corrugation has a crest and a valley, with the distance between the crest and valley of the fourth corrugation being a fourth distance which is greater than the first distance. In another embodiment of the invention, believed to be preferred, the pipe includes an intermediate corrugation located between the second and third corrugations. The intermediate corrugation has a crest and a valley, with the distance between the crest and valley of the intermediate corrugation being an intermediate distance, with the intermediate distance being greater than the third distance and less than the second distance.

The female portion wall member in one embodiment telescopically receives all of both the second corrugation and the third corrugation. The reinforcing means is comprised of a selection from a group comprising tape, an adhesive layer, and a suitable coating, such as plastic, and a selection from a group comprising fiberglass, metal, carbon fibers, and plastic fibers.

There is also disclosed a connection between two sections of corrugated pipe, which pipe has a plurality of first corrugations, with each of the first corrugations having a crest and a valley with the distance between the crest and valley of each of the first corrugations being a first distance. The connection has a male portion integrally molded to one of the sections and a female portion integrally molded to the other of the sections.

The male portion has at least one second corrugation, with each second corrugation having a crest and valley with the distance between the crest and valley of each second corrugation being a second distance. The male portion also has at least one third corrugation, with each third corrugation having a crest and valley with the distance between the crest and valley of each third corrugation being a third distance. The crest of each third corrugation has a recessed area. The second distance and the third distance each are less than the first distance.

The female portion is of a length which is greater than that associated with two corrugations. In the one embodiment, the two corrugations are the second and third corrugations. In another embodiment, the two corrugations are the third and intermediate corrugations. The female portion also has at least one corrugation thereon, and a pair of guide lines formed on the exterior of the female portion.

There is also disclosed an indeterminate length of dual-wall plastic pipe comprised of at least two corrugated sections of pipe joined by a coupler component. The coupler component has a male portion and a female portion to connect at least two corrugated sections. Each corrugated section has a plurality of first corrugations, with each of the first corrugations having a crest and a valley with the distance between the crest and valley of the first corrugations being a first distance.

The male portion of each corrugated section has at least one second corrugation. Each second corrugation has a crest and valley with the distance between the crest and valley of each second corrugation being a second distance. The male portion of each corrugated section has at least a single third corrugation. Each third corrugation has a crest and valley with the distance between the crest and valley of each third corrugation being a third distance.

The female portion wall member telescopically receives a third corrugation and at least a portion of a second corrugation. The crest of each third corrugation has a recessed area, with the recessed area accommodating a sealing element. The sealing element is retained between the recessed area and the female portion. The second distance and the third distance each are less than the first distance. The female portion has reinforcing means on a segment of the exterior surface of the female portion.

In one embodiment of the invention, the pipe includes a fourth corrugation, with each fourth corrugation having a crest and a valley, with the distance between the crest and valley of the fourth corrugation being a fourth distance, and with the fourth distance being greater than the first distance. In another embodiment of the invention, the pipe includes an intermediate corrugation, with each intermediate corrugation located between the second and third corrugations, and with the intermediate corrugation having a crest and a valley. The distance between the crest and valley of each intermediate corrugation is an intermediate distance, with the intermediate distance being greater than the third distance and less than the second distance.

The female portion is of a length which is greater than that associated with two corrugations. In the one embodiment, the two corrugations are the second and third corrugations. In another embodiment, the two corrugations are the third and intermediate corrugations. The female portion also has at least one corrugation thereon, and a pair of guide lines formed on the exterior of the female portion.

The primary objective of this invention is to provide a dual-wall plastic pipe with an in-line bell which is of relatively economical construction, is particularly easy to utilize in the laying of pipe, and most importantly is watertight.

Other objects and advantages of the invention will be apparent from the following description, the accompanying drawings, and the appended claims.

DETAILED DESCRIPTION OF THE DRAWINGS

Figure 1:
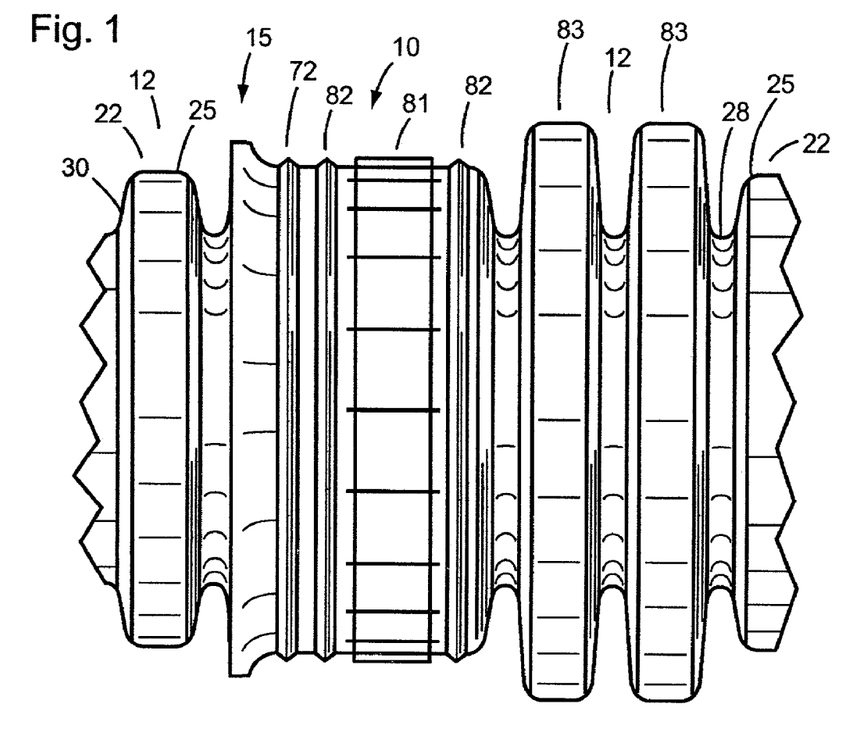
FIG. 1 is a side elevational view of a portion of a pipe of indeterminate length made in accordance with one embodiment of the present invention.
Figure 2:
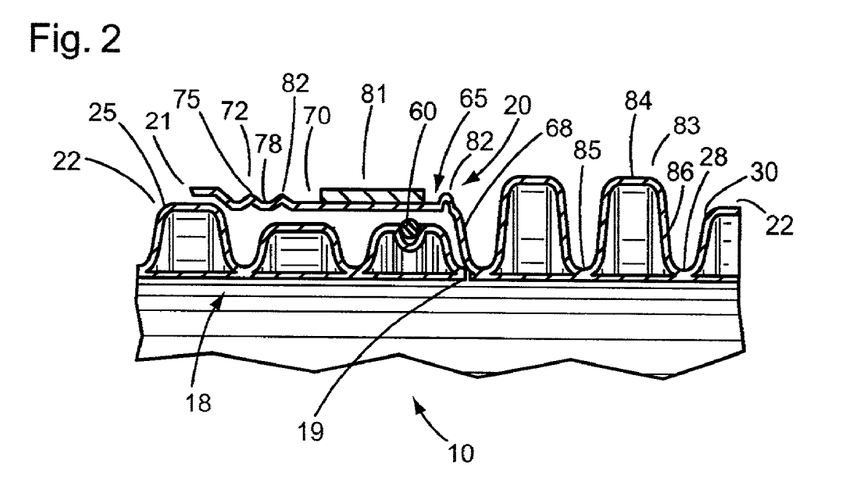
FIG. 2 is a vertical sectional view on an enlarged scale of the portion of the pipe shown in FIG. 1.
Figure 3:
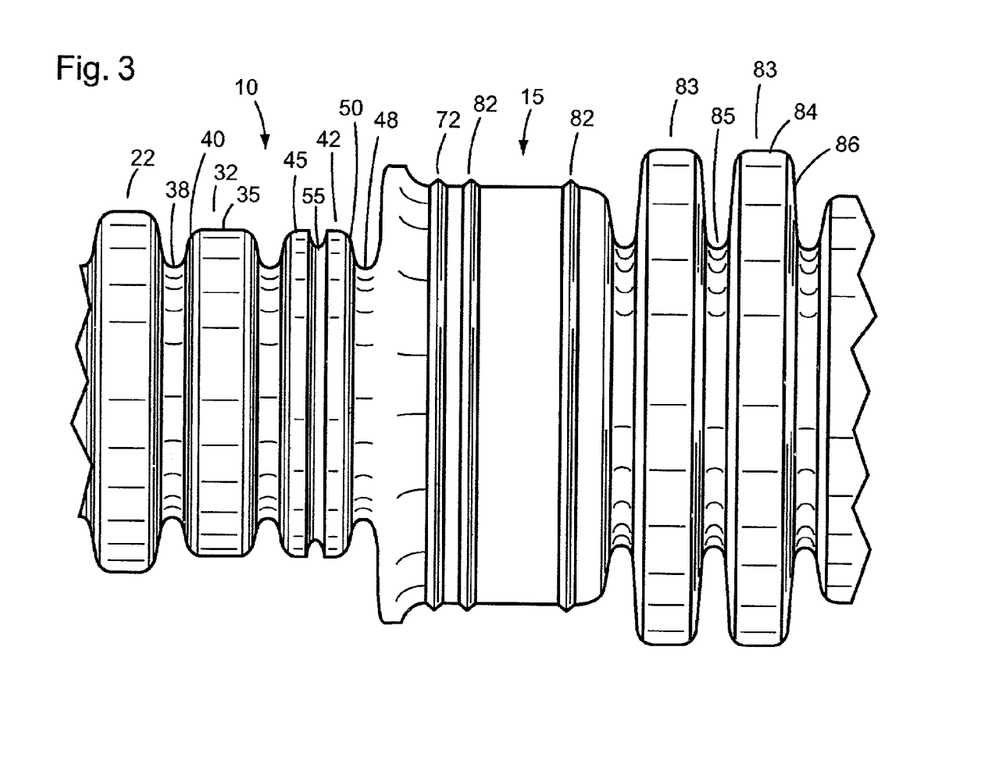
FIG. 3 is an side elevational view of the embodiment of FIG. 1 prior to severing the male portion and female portion of the coupler component of the invention.

Having reference to the drawings, attention is directed first to FIGS. 1-4 which disclose a first embodiment of a corrugated dual wall pipe of indeterminate length designated generally by the numeral 10 and made in accordance with the present invention. This pipe is shown in FIGS. 1 and 2 as it appears when it is installed in the ground as the initial drainage pipe at a location. As such, it can be appreciated that the pipe of this invention is not intended for use for re-lining of earlier laid pipe, but as the original drainage pipe at a location. It can also be appreciated that the pipe 10 is formed from a plurality of individual pipe sections 12. The pipe has a number of coupler components 15 with each coupler component having a male portion 18 with a male portion engagement edge 19, and a female portion 20 with a female portion engagement edge 21. To better appreciate the structure of the coupler component 15, reliance may also be had on FIGS. 3 and 4 which disclose the extruded product prior to being separated into the individual pipe sections 12.

Having reference to FIGS. 1-4, it will be appreciated that the pipe sections 12 are formed having a plurality of first corrugations 22. Each of the first corrugations 22 are formed having a crest or peak 25 as well as a trough or valley 28. The crests 25 and valleys 28 associated with each of the first corrugations 22 are connected by side walls 30.

Meanwhile, it will be appreciated that the male portion 18 is formed having at least one second corrugation 32. This second corrugation 32 is formed with a crest 35 and a valley 38 connected together by side wall 40. While the width of the second corrugation 32 is approximately the same as the width of the first corrugation 22, it will be readily appreciated that the distance between the crests and valley of the first corrugation being a first distance, is greater than the distance between the crest and valley of the second corrugation which is a second distance. In the embodiment of FIGS. 1-4, only a single second corrugation is shown.

The male portion 18 also includes at least a single third corrugation 42. This third corrugation 42 has a crest 45 and a valley 48 connected by the third corrugation side wall 50. Once again, although the width of the third corrugation is approximately the same as both the first and second corrugations 22 and 32 respectively, the height of the third corrugation, with that height being the difference between crest 45 and valley 48, is less than the height of the first corrugation. In this embodiment, the height of the third corrugation, the third distance, is preferably the same as the height of the second corrugation 32, the second distance.

One important difference between the crest 45 of the third corrugation 42 and the first or second corrugations is that the third corrugation includes a recessed or notched area 55. This recessed area 55 can be seen as accommodating or seating a sealing ring 60 which is secured between the recessed area 55 of the crest 45 of the third corrugation 42 of male portion 18 and the female portion 20. Specifically, the sealing ring 60 comes into contact with the female portion wall member 65. As such, the sealing ring performs as a gasket. An advantage of the structure of this invention over preexisting pipe structures is that using an elastomeric seal placed in a notched-type corrugation, as disclosed by this invention, provides a more economical seal than those which encase the entire juncture of adjacent pipes, due to not needing as large a mass of gasketing material.

The female portion wall member 65 has a side wall 68 as well as the engaging wall 70, which engaging wall actually comes into contact with the sealing ring 60. The engaging wall 70 is formed having at least one engaging wall corrugation 72, which functions similar to a stiffening rib. Each engaging wall corrugation 72 has a crest 75 as well as a valley 78, with the crest and valley being connected by an engaging wall corrugation side wall 80. The engaging wall corrugations 72, also referred to as stiffening rings, additionally provide dimensional control by making sure that the bell of the female portion wall member 65 remains concentric.

The length of the engaging wall is such that it spans the second and third corrugations and part of one of the first corrugations. Surrounding the engaging wall is a reinforcing means 81. The reinforcing means is shown as being located intermediate two guide lines 82. The reinforcing means could be tape, an adhesive layer or a suitable coating, even plastic, containing fiberglass, metal, carbon fibers, or plastic fibers, such that the plastic pipe which normally exhibits viscoelastic characteristics when subjected to a predetermined level of interior pressure is precluded from expanding outwardly at the site of the sealing ring or gasket.

The female portion wall member 65 also has a fourth corrugation 83. This fourth corrugation has a crest 84 and a valley 85 connected by the fourth corrugation side wall 86. Once again, although the width of the fourth corrugation is approximately the same as the first corrugation, the height of the fourth corrugation, with that height being the difference between crest 84 and valley 85, is greater than the height of the first corrugation. In this embodiment, the height of the fourth corrugation, the fourth distance, is preferably greater than the height of either the second or third corrugation's second and third distances respectively. It will also be appreciated, perhaps best from FIG. 2, that the outer diameter of the fourth corrugation is about the same as the outer diameter of the distal end of the engaging wall.

Figure 4:
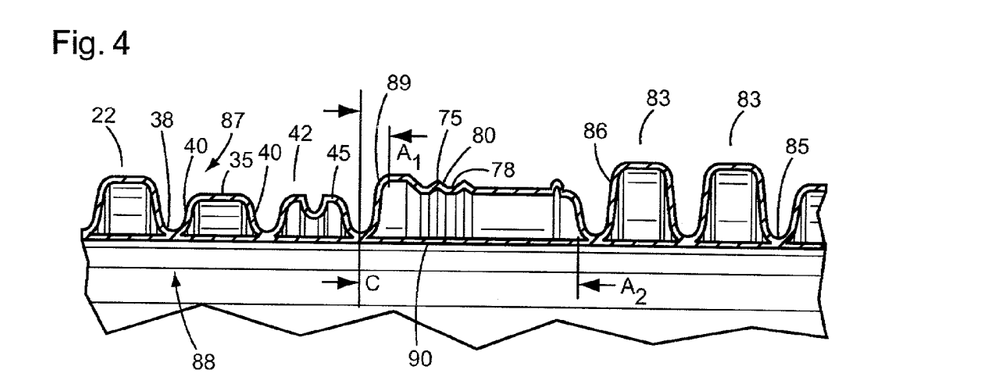
FIG. 4 is a vertical sectional view on an enlarged scale of the portion of the pipe shown in FIG. 3.

In actual use, the structure of this embodiment is formed by extruding both the outer wall 87 and inner wall 88 together. Air or pressure is used to bring the two walls into contact with one another as is well known in the art of dual wall pipe extrusion. The extruded product is then cut at line C completely through the extruded structure, then the portion of the outer wall section 89 corresponding to the length A-1 shown in FIG. 4 is cut away, as is the portion of inner wall section 90 shown in FIG. 4 having the distance A-2. The reinforcing means can then be applied, with the guide lines serving to assist in the manufacturing process, since the reinforcing means is located intermediate the lines, and as so located is positioned above or on the exterior of the gasket.

In actual field installation, one pipe section can be positioned in the trench dug for it. A sealing ring 60 is placed within the recessed area 55. A female portion of a pipe section 12 is then engaged with the male a portion 18 of the other pipe section 12. As such, it can be readily appreciated that the installation of the pipe of this invention does not involve relining.

Figure 5:
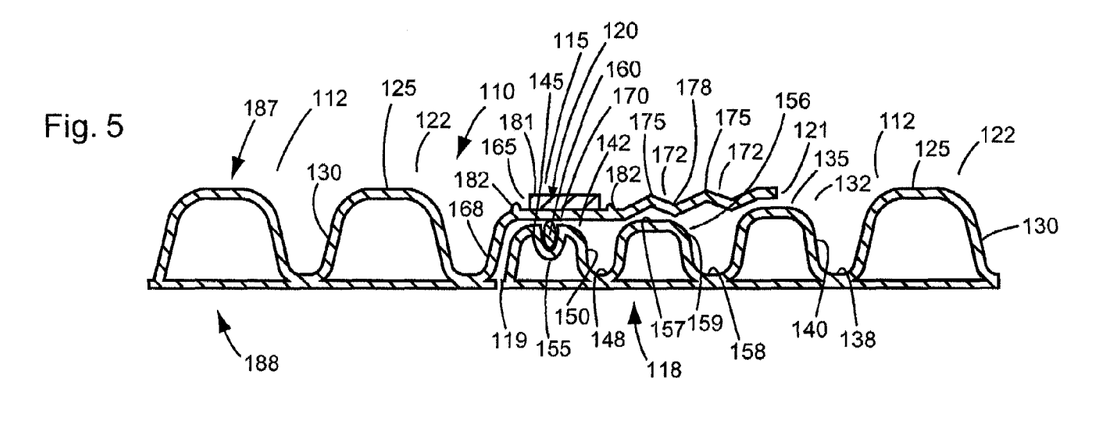
FIG. 5 is a vertical sectional view on an enlarged scale of a portion of a pipe of indeterminate length made in accordance with a second embodiment of the present invention.
Figure 6:
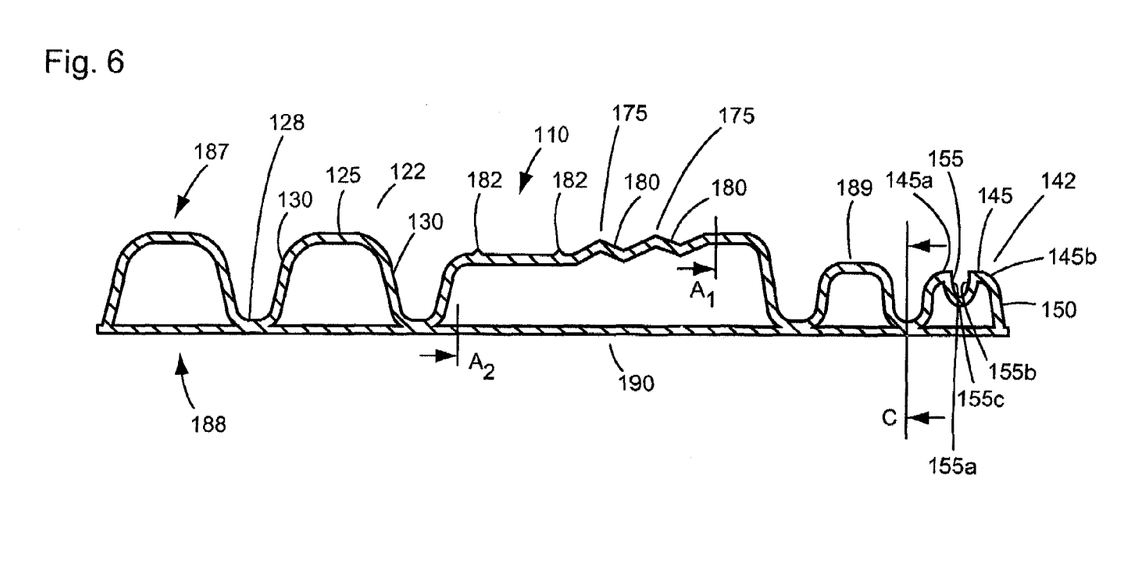
FIG. 6 is an vertical sectional view on an enlarged scale of the embodiment of FIG. 5 prior to severing the male portion and female portion of the coupler component of the invention.

Turning now to a second embodiment of the invention as shown in FIGS. 5 and 6, there is disclosed yet another embodiment of a corrugated dual wall pipe of indeterminate length designated generally by the numeral 110 and made in accordance with the present invention. This pipe is shown in FIGS. 5 and 6 in views similar to the first embodiments as shown in FIGS. 2 and 4. Thus FIG. 5 shows how the second embodiment appears when it is installed in the ground as the initial drainage pipe at a location. As such, it can be appreciated that the pipe of this invention is not intended for use for re-lining of earlier laid pipe, but as the original drainage pipe at a location. It can also be appreciated that the pipe 110 is formed from a plurality of individual pipe sections 112. The pipe has a number of coupler components 115 with each coupler component having a male portion 118 with a male portion engagement edge 119, and a female portion 120 with a female portion engagement edge 121. To better appreciate the structure of the coupler component 115, reliance may also be had on FIG. 6 which discloses the extruded product prior to being separated into the individual pipe sections 112.

Having reference to FIGS. 5 and 6, it will be appreciated that the pipe sections 112 are formed having a plurality of first corrugations 122. Each of the first corrugations 122 are formed having a crest or peak 125 as well as a trough or valley 128. The crests 125 and valleys 128 associated with each of the first corrugations 122 are connected by side walls 130.

Meanwhile, it will be appreciated that the male portion 118 is formed having at least one second corrugation 132. This second corrugation 132 is formed with a crest 135 and a valley 138 connected together by side wall 140. Although the width of the second corrugation 132 in this embodiment may be, and preferably is, less than the width of the first corrugation 122, it will be readily appreciated that the distance between the crests and valley of the first corrugation being a first distance, is greater than the distance between the crest and valley of the second corrugation which is a second distance. In the embodiment of FIGS. 5 and 6, only a single second corrugation is shown.

The male portion 118 also includes at least a single third corrugation 142. This third corrugation 142 has a crest 145 and a valley 148 connected by the third corrugation side wall 150. Once again, while the width of the third corrugation may be, and preferably is, less than the width of the first corrugation 122, the height of the third corrugation, with that height being the difference between crest 145 and valley 148, is also less than the height of the first corrugation. In this embodiment, the height of the third corrugation, the third distance, is preferably slightly less than the height of the second corrugation 132, the second distance.

One important difference between the crest 145 of the third corrugation 142 and the first or second corrugations is that the third corrugation includes a recessed or notched area 155. This recessed area 155 can be seen as accommodating or seating a sealing ring 160 which is secured between the recessed area 155 of the crest 145 of the third corrugation 142 of male portion 118 and the female portion 120. Specifically, the sealing ring 160 comes into contact with the female portion wall member 165. As such, the sealing ring performs as a gasket. An advantage of the structure of this invention over preexisting pipe structures is that using an elastomeric seal placed in a notched-type corrugation, as disclosed by this invention, provides a more economical seal than those which encase the entire juncture of adjacent pipes, due to not needing as large a mass of gasketing material.

Although it could be possible to have the recess 155 positioned anywhere along the crest, in the preferred embodiment the location is slightly offset. Thus as can be appreciated the width of crest segment 145a is less than the width of crest segment 145b. Consequently, the height of recess sidewall segment 155a, which terminates at crest segment 145a, is equal or preferably less than the height of recess sidewall segment 155b, which terminates at crest segment 145b, with both heights being based on the vertical distance from the bottom of recess trough 155c to the respective junctures of the sidewall segments and crest segments. By having the recess offset, and especially by having the recess sidewall segment 155b greater in height than recess sidewall segment 155a, it is submitted that the gasket will be able to achieve a tighter fit between the recess and the female engaging member, and be better able to resist rolling past the recess into the next trough.

The male portion 118 of all but the smallest diameter pipes also includes at least a single intermediate corrugation 156, positioned between the second and third corrugations. This intermediate corrugation 156 has a crest 157 and a valley 158 connected by the intermediate corrugation side wall 159. Once again, while the width of the intermediate corrugation may be, and preferably is, less than the width of the first corrugation 122, the height of the intermediate corrugation, with that height being the vertical difference between crest 157 and valley 158, is also less than the height of the first corrugation. In this embodiment, the height of the intermediate corrugation, the intermediate distance, is preferably slightly less than the height of the second corrugation 132, the second distance, and slightly greater than the height of the third corrugation 142, the third distance.

The female portion wall member 165 has a side wall 168 as well as the engaging wall 170, which engaging wall actually comes into contact with the sealing ring 160. The engaging wall 170 is formed having at least one engaging wall corrugation 172, which functions similar to a stiffening rib. Each engaging wall corrugation 172 has a crest 175 as well as a valley 178, with the crest and valley being connected by an engaging wall corrugation side wall 180. The engaging wall corrugations 172, also referred to as stiffening rings, additionally provide dimensional control by making sure that the bell of the female portion wall member 165 remains concentric. As can best be seen with reference to FIG. 6, in this embodiment of the invention, the outer diameter of the female portion engagement edge 121 is equal to the outer diameter of the first or main corrugations 122.

The length of the engaging wall is such that it spans the third and intermediate corrugations and part of the second corrugation. Surrounding the engaging wall is a reinforcing means 181. The reinforcing means is shown as being located intermediate two guide lines 182. The reinforcing means could be tape, an adhesive layer or a suitable coating, even plastic, containing fiberglass, metal, carbon fibers, or plastic fibers, such that the plastic pipe which normally exhibits viscoelastic characteristics when subjected to a predetermined level of interior pressure is precluded from expanding outwardly at the site of the sealing ring or gasket.

In actual use, the structure of this embodiment is formed by extruding both the outer wall 187 and inner wall 188 together. Air or pressure is used to bring the two walls into contact with one another as is well known in the art of dual wall pipe extrusion. The extruded product is then cut at line C completely through the extruded structure, then the portion of the outer wall section 189 corresponding to the length A-1 shown in FIG. 6 is cut away, as is the portion of inner wall section 190 shown in FIG. 6 having the distance A-2. The reinforcing means can then be applied, with the guide lines serving to assist in the manufacturing process, since the reinforcing means is located intermediate the lines, and as so located is positioned above or on the exterior of the gasket.

In actual field installation, one pipe section can be positioned in the trench dug for it. A sealing ring 160 is placed within the recessed area 155. A female portion of a pipe section 112 is then engaged with the male portion 118 of the other pipe section 112. As such, it can be readily appreciated that the installation of the pipe of this invention does not involve relining. When the pipe sections are aligned as shown in FIG. 5, the crests 175 associated with the engaging wall corrugation 172 should be approximately the same vertical distance from the inner wall 188 as crest 125 of the first corrugations 122 is above the same inner wall 188.

Therefore, in both embodiments not only are the various joints aligned, but no special digging is required. This constitutes a considerable reduction in labor as well as installation expense.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. In a corrugated pipe comprising two sections joined by telescopically mating a male end of one section with a female end of the other section, the improvement comprising:

an annular sealing element fixed to the exterior surface of the male end and disposed to sealingly engage the interior surface of the female end;

an annular band of reinforcing material disposed around the exterior surface of the female end at a position along the longitudinal axis thereof that is in general alignment with the sealing element, the reinforcing material arranged to prevent loss of a sealing engagement between the female end and the sealing element when the female end is subjected to a predetermined level of internal pressure; and wherein the reinforcing material is not a hose clamp, the annular sealing element is disposed in an annular channel in the outer surface of the male end, the male end includes at least two corrugations comprising at least two axially-spaced, annular crests and valleys therebetween, the two crests defining the outside diameter of the male end, the annular channel being formed in one of the crests, and the male end includes an annular intermediate corrugation defining an outside diameter greater than the outside diameter of the male end, and being disposed to engage the distal end of the female end when fully mated.

2. The corrugated pipe of claim 1, wherein each section includes opposed male and female ends and the outside pipe diameter of each section between its respective male and female ends is substantially the same.

3. The corrugated pipe of claim 2, wherein the outside diameter of each female end is substantially the same as the outside pipe diameter of each section.

4. The corrugated pipe of claim 1, wherein the female end is made of a first material, and the annular band of reinforcing material includes a second material that is different from the first material of the female end.

5. The corrugated pipe of claim 4, wherein the first material is plastic, and the second material includes one or more of a fiberglass, carbon, or plastic fiber.

6. The corrugated pipe of claim 4, wherein the second material resists deformation greater than the first material.

7. In a corrugated pipe comprising two sections joined by telescopically mating a male end of one section with a female end of the other section, the improvement comprising:

an annular sealing element fixed to the exterior surface of the male end and disposed to sealingly engage the interior surface of the female end; and an annular band of reinforcing material disposed around the exterior surface of the female end at a position along the longitudinal axis thereof that is in general alignment with the sealing element, the reinforcing material structurally configured to prevent loss of sealing engagement between the female end and the sealing element during use of the pipe;

wherein the annular sealing element is disposed in an annular channel in the outer surface of the male end;

wherein the male end includes at least two corrugations comprising at least two axially-spaced, annular crests and valleys therebetween, the two crests defining the outside diameter of the male end, and wherein the annular channel is formed in one of the crests;

wherein the male end includes an annular intermediate corrugation defining an outside diameter greater than the outside diameter of the male end, and being disposed to engage the distal end of the female end when fully mated; and wherein the outside diameter of the intermediate corrugation is less than the outside pipe diameter.

8. The corrugated pipe of claim 7, wherein each section includes opposed male and female ends and the outside pipe diameter of each section between its respective male and female ends is substantially the same.

9. The corrugated pipe of claim 8, wherein the outside diameter of each female end is substantially the same as the outside pipe diameter of each section.

10. The corrugated pipe of claim 7, wherein the female end is made of a first material, and the annular band of reinforcing material includes a second material that is different from the first material of the female end.

11. The corrugated pipe of claim 10, wherein the first material is plastic, and the second material includes one or more of a fiberglass, carbon, or plastic fiber.

12. The corrugated pipe of claim 10, wherein the second material resists deformation greater than the first material.

13. A corrugated pipe comprising:

a male end having a corrugation;

a female end disposed around the male end and capable of expanding to allow fluid flow outside of the male end when the male and female ends are subjected to a predetermined level of internal pressure;

a gasket disposed around the corrugation of the male end; and a ring separately disposed around the female end and arranged to maintain a seal between an outer surface of the gasket and an inner surface of the female end when the male and female ends are subjected to the predetermined level of internal pressure;

wherein the ring is not a hose clamp, the female end includes a first type of material, and the ring includes a second type of material that has a greater structural rigidity than the first type of material of the female end; and wherein the female end includes at least one guide for maintaining the ring in radial alignment with the gasket.

14. The corrugated pipe of claim 13, wherein the gasket is disposed in an annular channel formed in the corrugation of the male end.

15. The corrugated pipe of claim 13, wherein the ring is radially aligned with the gasket.

16. The corrugated pipe of claim 13, wherein the ring comprises any one of a single piece of material that does not include any structure for allowing the ring to be unwound or expanded, a coating that includes a plastic material, or a coating that includes one or more of a fiberglass, carbon, or plastic fiber.

17. The corrugated pipe of claim 13, wherein the ring includes one or more of a fiberglass portion, a carbon portion, or a plastic fiber portion, and the expandable material of the female end comprises plastic.

18. A reinforcement for a corrugated pipe connection having a male end with a corrugation, a female end disposed around the male end, and a seal between an outer surface of the corrugation of the male end and an inner surface of the female end, comprising:

a reinforcing member separately coated around an outer surface of the female end and structurally configured to maintain the seal between the outer surface of the corrugation of the male end and the inner surface of the female end when the pipe is subjected to a predetermined level of interior pressure;

wherein the female end comprises a plastic material, and the reinforcing member includes plastic material and one or more of a fiberglass material, a carbon fiber material, or a plastic fiber material; and wherein the female end includes at least one guide for maintaining the reinforcing member in radial alignment with the seal between the outer surface of the corrugation of the male end and the inner surface of the female end.

19. The reinforcement of claim 18, wherein a bond is formed between the plastic material of the female end and the plastic material of the reinforcing member.

20. The reinforcement of claim 18, wherein the reinforcing member comprises a coating.

21. The reinforcement of claim 18, wherein the reinforcing member resists deformation caused by the predetermined level of interior pressure greater than the plastic material of the female end of the corrugated pipe.

22. The reinforcement of claim 18, wherein the reinforcing member is coated around an exterior surface of the female end.

23. The reinforcement of claim 18, wherein the reinforcing member is radially aligned with the seal between the outer surface of the corrugation of the male end and the inner surface of the female end.

24. The reinforcement of claim 18, wherein the reinforcing member has a width that is greater than a width of the seal between the outer surface of the corrugation of the male end and the inner surface of the female end.

25. The reinforcement of claim 24, wherein the width of the reinforcing member is not substantially greater than a width of the corrugation of the male end.

* * * * *